(12) United States Patent
Tsai

(10) Patent No.: US 12,017,772 B2
(45) Date of Patent: Jun. 25, 2024

(54) WING ASSEMBLIES WITH THREE-POSITION KRUEGER FLAPS AND METHODS OF OPERATING THREE-POSITION KRUEGER FLAPS

(71) Applicant: The Boeing Company, Chicago, IL (US)

(72) Inventor: Kevin Raylin Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 83 days.

(21) Appl. No.: 17/866,324

(22) Filed: Jul. 15, 2022

(65) Prior Publication Data

US 2024/0017819 A1   Jan. 18, 2024

(51) Int. Cl.
*B64C 9/24* (2006.01)
*B64C 9/02* (2006.01)
*B64C 13/32* (2006.01)

(52) U.S. Cl.
CPC ............... *B64C 9/24* (2013.01); *B64C 9/02* (2013.01); *B64C 13/32* (2013.01)

(58) Field of Classification Search
CPC ............. B64C 9/24; B64C 9/02; B64C 13/32
See application file for complete search history.

(56) References Cited

U.S. PATENT DOCUMENTS

| | | |
|---|---|---|
| 3,504,870 A | 4/1970 | Cole et al. |
| 3,556,439 A | 1/1971 | Autry et al. |
| 3,743,219 A | 7/1973 | Gorges |
| 3,910,530 A | 10/1975 | James et al. |
| 3,917,192 A | 11/1975 | Alvarez-Calderon |
| 3,941,334 A | 3/1976 | Cole |
| 3,994,451 A | 11/1976 | Cole |
| 4,189,120 A | 2/1980 | Wang |
| 4,189,121 A | 2/1980 | Harper et al. |
| 4,262,868 A | 4/1981 | Dean |
| 4,351,502 A | 9/1982 | Statkus |
| 5,158,252 A | 10/1992 | Sakurai |
| 7,578,484 B2 | 8/2009 | Fox et al. |
| 9,016,637 B2 | 4/2015 | Sakurai et al. |
| 9,896,190 B1 * | 2/2018 | Amorosi .................. B64C 3/14 |

(Continued)

FOREIGN PATENT DOCUMENTS

| | | |
|---|---|---|
| DE | 2101536 A1 | 9/1972 |
| WO | WO 2008/051286 A2 | 5/2008 |

OTHER PUBLICATIONS

English language translation of German Patent Application Publication No. 2101536, Sep. 7, 1972.

*Primary Examiner* — Rodney A Bonnette
(74) *Attorney, Agent, or Firm* — Kolitch Romano Dascenzo Gates LLC

(57) ABSTRACT

Wing assemblies comprise a three-position Krueger flap and an actuation assembly that comprises a drive linkage assembly, a primary linkage assembly coupled between the drive linkage assembly and the three-position Krueger flap, and a secondary linkage assembly. The primary linkage assembly comprises a dual linkage that is pivotally and translationally coupled relative to a wing support structure. The secondary linkage assembly comprises a cam, a follower, and a dual-linkage axle that is coupled to the follower and to the dual linkage and that defines a dual-linkage pivot axis of the dual linkage.

20 Claims, 8 Drawing Sheets

(56) References Cited

U.S. PATENT DOCUMENTS

| | | | |
|---|---|---|---|
| 2006/0000952 A1* | 1/2006 | Rampton | B64C 9/22 |
| | | | 244/214 |
| 2006/0102803 A1 | 5/2006 | Wheaton et al. | |
| 2009/0072093 A1* | 3/2009 | Fox | B64C 9/22 |
| | | | 244/214 |
| 2020/0017193 A1* | 1/2020 | Grimminger | B64C 9/02 |

* cited by examiner

WING ASSEMBLIES WITH THREE-POSITION KRUEGER FLAPS AND METHODS OF OPERATING THREE-POSITION KRUEGER FLAPS

FIELD

The present disclosure relates to three-position Krueger flaps.

BACKGROUND

Krueger flaps (also Krüger flaps) are leading edge flight control surfaces used on many modern airliners. Unlike slats and droop flaps, Krueger flaps do not define the leading edge and upper surface of a wing during cruise. Rather, Krueger flaps typically define a forward portion of the lower surface of the wing during cruise, and pivot outward for take-off and landing to increase the lift of the wing. Three-position Krueger flaps include distinct take-off and landing positions, with the Krueger flap being positioned more forward in the landing position than in the take-off position.

SUMMARY

Wing assemblies comprise a primary airfoil, a three-position Krueger flap that is operatively coupled relative to the primary airfoil, a wing support structure, and an actuation assembly. The actuation assembly comprises at least one actuator, a drive linkage assembly, a primary linkage assembly, and a secondary linkage assembly. The at least one actuator is mounted to the wing support structure and comprises at least one output. The drive linkage assembly is coupled to the at least one output of the at least one actuator. The primary linkage assembly is coupled between the drive linkage assembly and the three-position Krueger flap and comprises a dual linkage that is pivotally and translationally coupled relative to the wing support structure about a dual-linkage pivot axis. The secondary linkage assembly comprises a cam, a follower, and an axle. The cam is coupled to the at least one output of the at least one actuator and comprises a cam surface that defines a cam profile. The follower is engaged with the cam surface. The axle is coupled to the follower and to the dual linkage and defines the dual-linkage pivot axis.

Methods of operating a three-position Krueger flap of a wing assembly of an aircraft comprise transitioning the three-position Krueger flap between a take-off configuration and a landing configuration by translating, relative to a wing support structure, a dual-linkage pivot axis of a dual linkage of a primary linkage assembly that is coupled between a drive linkage assembly and the three-position Krueger flap. The drive linkage assembly is coupled to at least one output of at least one actuator that is mounted to the wing support structure.

DESCRIPTION

Figure 1:
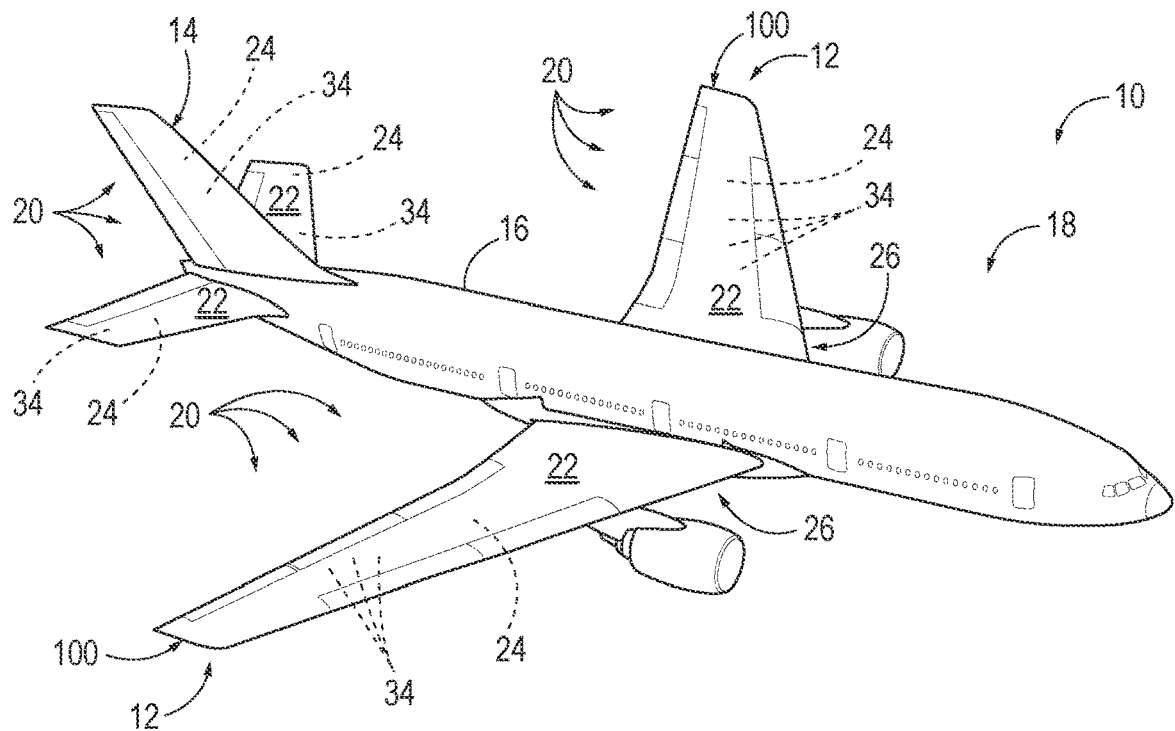
FIG. 1 is an illustration of an example aircraft.

FIGS. 1-11 provide illustrative, non-exclusive examples of aircraft 10 and wing assemblies 100 with three-position Krueger flaps 26, and components thereof, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency.

FIG. 1 is a schematic representation of an aircraft 10 that may comprise wing assemblies 100 according to the present disclosure. While aircraft 10 is depicted as a fixed-wing airliner, aircraft 10 and wing assemblies 100 according to the present disclosure are not limited to such examples, and aircraft 10 may be fixed-wing aircraft, commercial aircraft, military aircraft, passenger aircraft, autonomous aircraft, rotorcraft, etc. Aircraft 10 typically include wings 12 and a tail 14 that are supported by a fuselage 16 to form and/or define an airframe 18. The wings 12 and the tail 14 include a plurality of flight control surfaces 20 that are configured to be selectively moved relative to primary airfoil 22 surfaces of the wings 12 or the tail 14. Examples of flight control surfaces 20 include flaps, slats, rudders, elevators, spoilers, ailerons, flaperons, and Krueger flaps, including three-position Krueger flaps 26. Actuation of the flight control surfaces 20 changes one or more aerodynamic characteristics of the aircraft 10 in a desired manner. Actuation of the flight control surfaces 20 may be facilitated, controlled, and/or regulated by one or more actuation assemblies 34 that are supported by, or otherwise coupled to, one or more wing support structures 24. Examples of support structures 24 include spars, ribs, or other underlying framework of a wing 12 or a tail 14.

Figure 2:
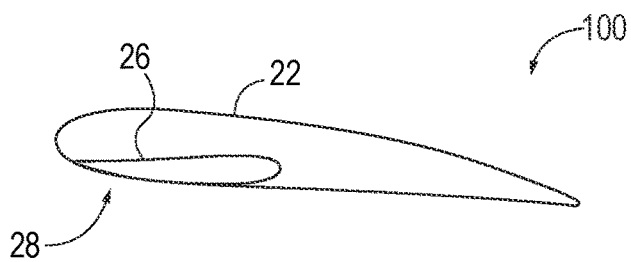
FIG. 2 is a schematic profile view of an aircraft wing with a three-position Krueger flap in a cruise configuration.
Figure 3:
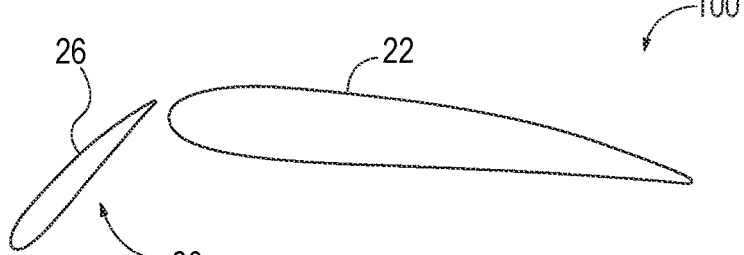
FIG. 3 is a schematic profile view of an aircraft wing with a three-position Krueger flap in a landing configuration.
Figure 4:
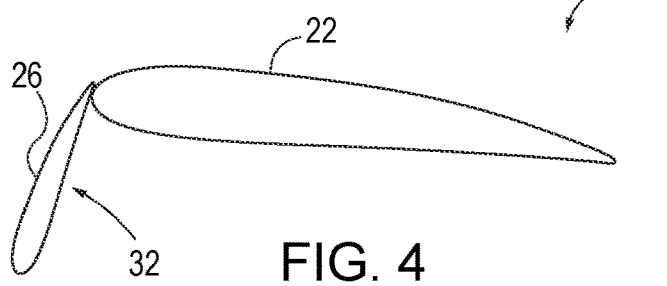
FIG. 4 is a schematic profile view of an aircraft wing with a three-position Krueger flap in a take-off configuration.

As schematically represented in FIGS. 2-4, three-position Krueger flaps 26 have a cruise configuration 28, a landing configuration 30, and a take-off configuration 32. In the cruise configuration 28, the three-position Krueger flap 26 defines a forward lower portion of the wing that generally conforms with the primary airfoil 22. In the landing configuration 30, the three-position Krueger flap 26 is pivoted forward of the primary airfoil 22. In the take-off configuration 32, the three-position Krueger flap 26 is translated aft relative to the landing configuration 30, and in some examples, is engaged with a leading edge of the primary airfoil 22.

Figure 5:
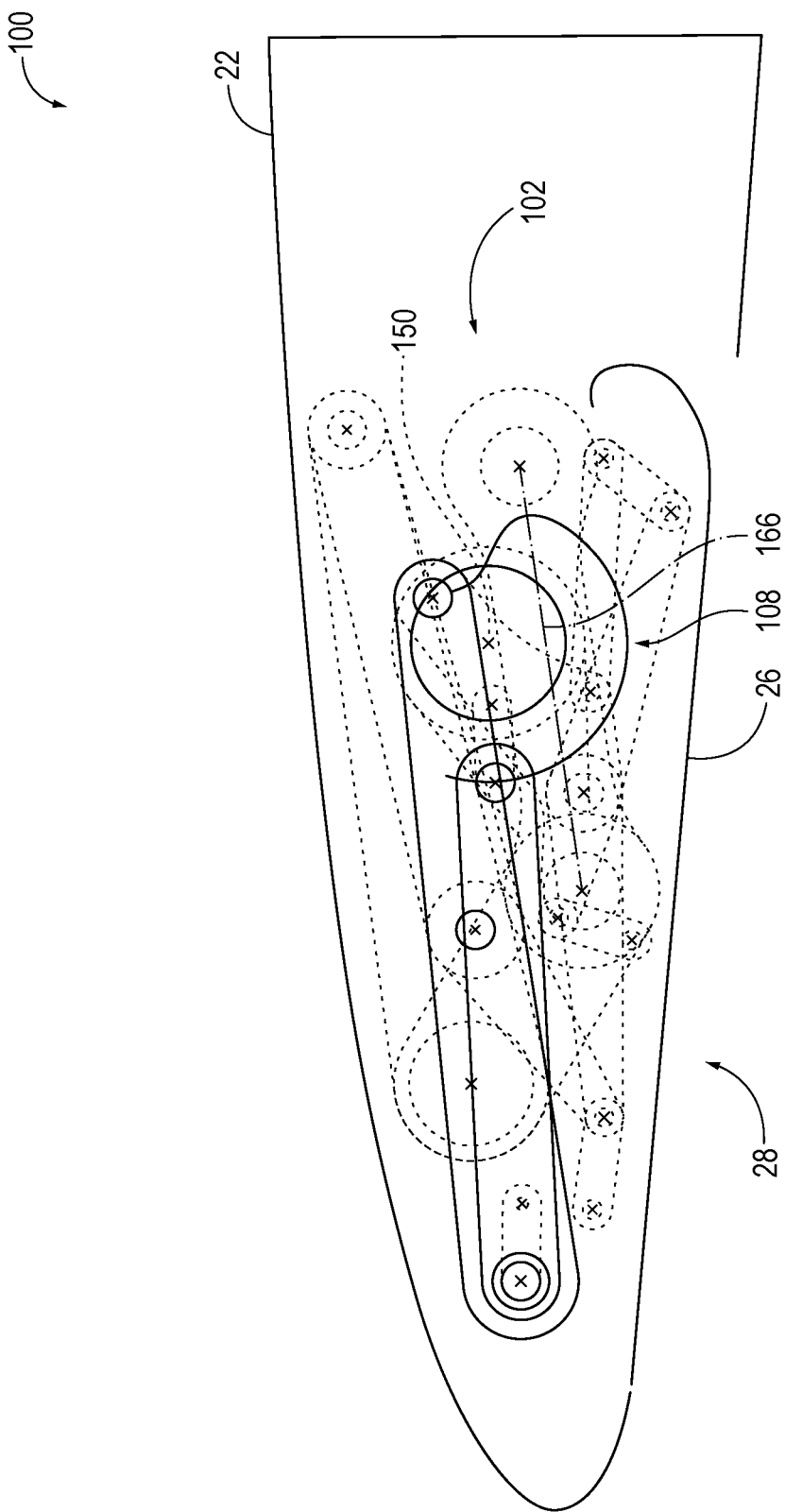
FIG. 5 is a schematic representation of wing assemblies according to the present disclosure comprising a three-position Krueger flap in the cruise configuration.
Figure 6:
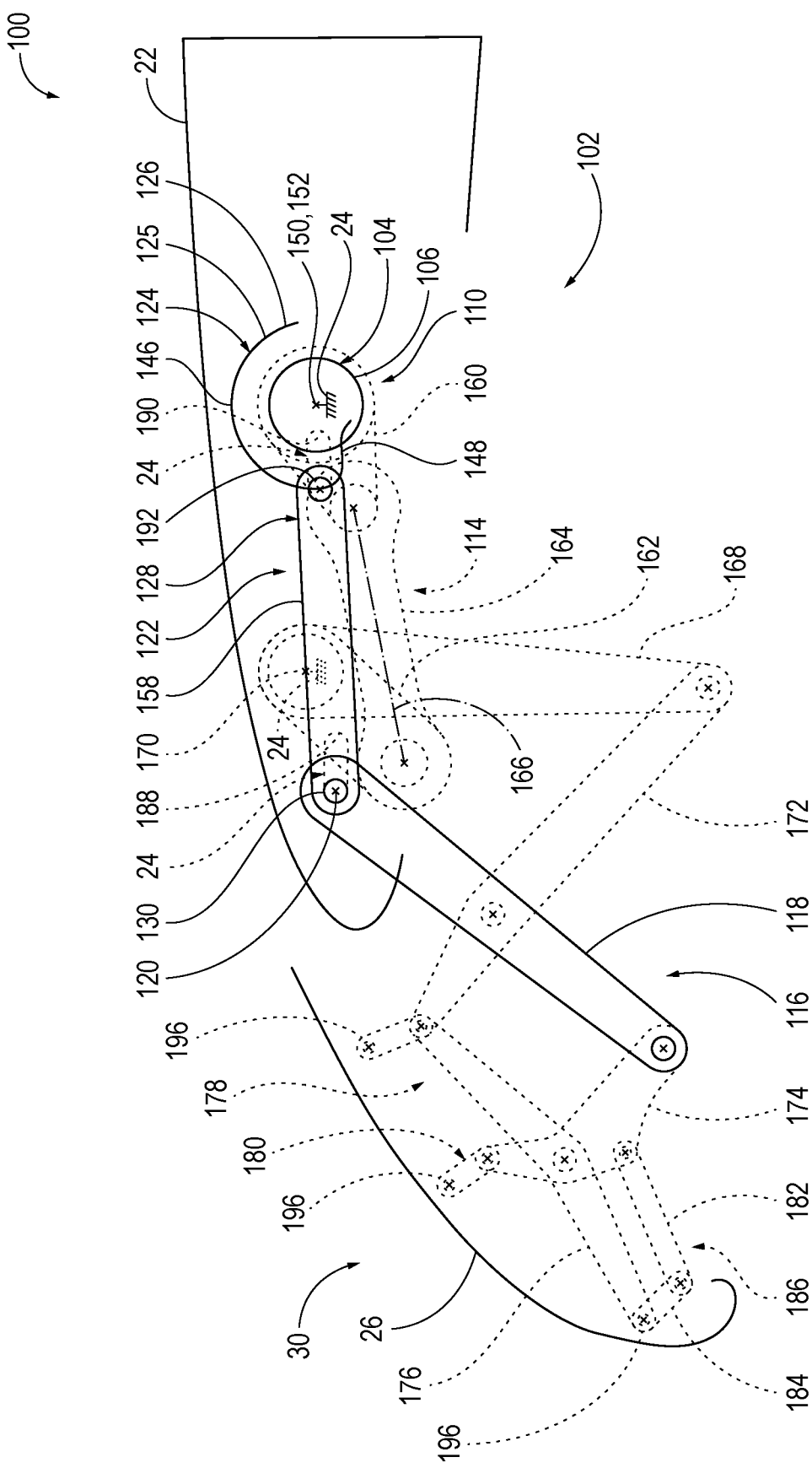
FIG. 6 is a schematic representation of wing assemblies according to the present disclosure comprising a three-position Krueger flap in the landing configuration.
Figure 7:
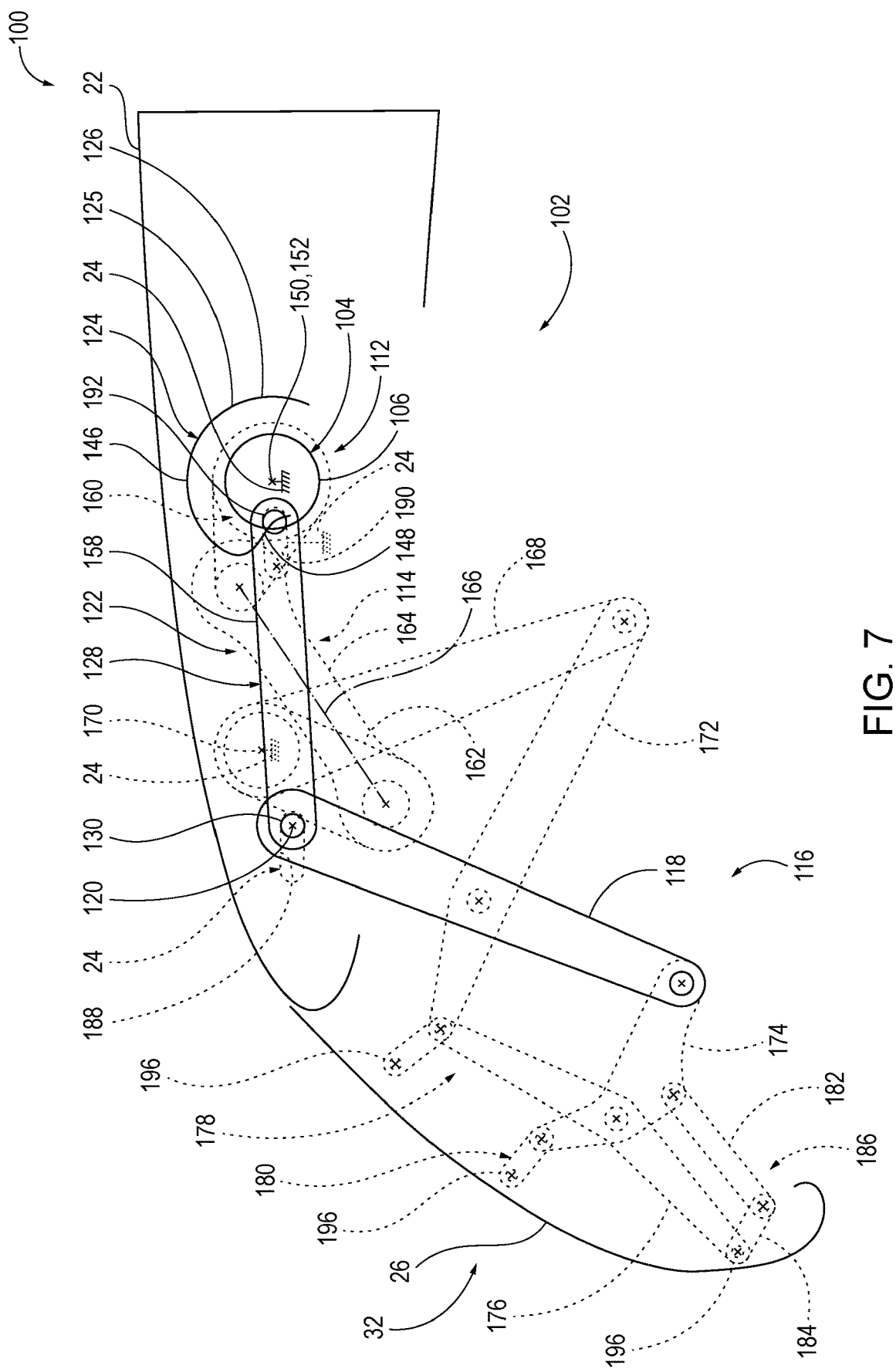
FIG. 7 is a schematic representation of wing assemblies according to the present disclosure comprising a three-position Krueger flap in the take-off configuration.

Turning to FIGS. 5-7, wing assemblies 100 according to the present disclosure are schematically represented with a three-position Krueger flap 26 in each of a cruise configuration 28 (FIG. 5), a landing configuration 30 (FIG. 6), and a take-off configuration 32 (FIG. 7). In FIGS. 5-7, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As schematically illustrated, wing assemblies 100 comprise a primary airfoil 22, a three-position Krueger flap 26 that is operatively coupled relative to the primary airfoil 22, a wing support structure 24, and an actuation assembly 102. The actuation assembly 102 comprises at least one actuator 104, a drive linkage assembly 114, a primary linkage assembly 116, and a secondary linkage assembly 122. The actuator 104 is mounted to the wing support structure 24 and comprises at least one output 106. An output 106 may comprise or be a shaft, for example. The drive linkage assembly 114 is coupled to the at least one output 106 of the at least one actuator 104 for operative actuation of the primary linkage assembly 116. That is, the drive linkage assembly 114 drives operation of the primary linkage assembly 116. The wing assembly 100 may comprise a single actuator 104 that is operatively coupled both to the drive linkage assembly 114 and to the secondary linkage assembly 122, or the wing assembly 100 may comprise two separate actuators 104, one operatively coupled to the drive linkage assembly 114 and one operatively coupled to the secondary linkage assembly 122 and with the outputs 106 of the two actuators 104 synchronized. The actuator(s) 104 may be rotary actuators with rotational outputs, and/or the actuator(s) 104 may be linear actuators with linear outputs and additional mechanisms included to translate the linear outputs to rotational motion for operative actuation of the actuation assembly 102.

The primary linkage assembly 116 is coupled between the drive linkage assembly 114 and the three-position Krueger flap 26. The primary linkage assembly 116 comprises a dual linkage 118 that is pivotally and translationally coupled relative to the wing support structure 24 about a dual-linkage pivot axis 120. That is, during operation of the three-position Krueger flap 26 between its three configurations, not only does the dual linkage 118 pivot about the dual-linkage pivot axis 120, but also the dual-linkage pivot axis 120 itself translates (e.g., slides) relative to the wing support structure 24. In particular, the dual linkage 118 interconnects the primary linkage assembly 116 and the secondary linkage assembly 122 as discussed herein, such that the drive linkage assembly 114 drives the pivotal movement of the dual linkage 118, and the secondary linkage assembly 122 drives the translational movement of the dual linkage 118.

The secondary linkage assembly 122 comprises at least a cam 124, a follower 128, and a dual-linkage axle 130. The cam 124 is coupled to an output 106 of the actuator(s) 104 and comprises a cam surface 125 that defines a cam profile 126. The follower 128 is engaged with the cam surface 125. The dual-linkage axle 130 is coupled to the follower 128 and to the dual linkage 118, and the dual-linkage axle 130 defines the dual-linkage pivot axis 120. That is, the dual-linkage axle 130 not only defines the dual-linkage pivot axis 120, about which the dual linkage 118 operatively pivots, but also provides structure for translating the dual linkage 118 relative to the wing support structure 24 responsive to actuation of the secondary linkage assembly 122.

The output(s) 106 of the actuator(s) 104 may be described as having an effective rotational stroke corresponding to the full range of configurations of the three-position Krueger flap 26, that is, the cruise configuration 28, the landing configuration 30, and the take-off configuration 32. In particular, the effective rotational stroke has a first portion that ranges from a cruise position 108 at one terminus of the effective rotational stroke to a landing position 110, and a second portion that ranges from the landing position 110 to a take-off position 112 at an opposite terminus of the effective rotational stroke. The three-position Krueger flap 26 is in the cruise configuration 28 when the output(s) 106 are in the cruise position 108, in the landing configuration 30 when the output(s) 106 are in the landing position 110, and in the take-off configuration 32 when the output(s) 106 are in the take-off position 112.

As perhaps most easily seen in FIGS. 6 and 7, in some examples, the cam profile 126 comprises a circular arc region 146 and a transverse region 148 that extends radially inward from the circular arc region 146. The output 106 that is coupled to the secondary linkage assembly 122 may be described as having an output axis of rotation 150, and in some examples, the circular arc region 146 of the cam profile 126 has a center 152 that coincides with the output axis of rotation 150. Accordingly, during rotation of the cam 124, when the follower 128 is engaged within the circular arc region 146 of the cam profile 126, the cam 124 does not affect the translational position of the follower 128. The circular arc region 146 of the cam profile 126 corresponds to a transition between the cruise configuration 28 and the landing configuration 30. In particular, the follower 128 is engaged with the cam surface 125 within the circular arc region 146 of the cam profile 126 when the three-position Krueger flap 26 is transitioning between the cruise configuration 28 and the landing configuration 30.

The transverse region 148 of the cam profile 126 corresponds to a transition between the landing configuration 30 and the take-off configuration 32. In particular, the follower 128 is engaged with the cam surface 125 within the transverse region 148 of the cam profile 126 when the three-position Krueger flap 26 is transitioning between the landing configuration 30 and the take-off configuration 32. Accordingly, where, or near where, the circular arc region 146 and the transverse region 148 meet corresponds to the landing configuration 30. That is, the three-position Krueger flap 26 is in the landing configuration 30 when the follower 128 is engaged with the cam surface 125 where, or near where, the circular arc region 146 meets the transverse region 148.

Stated differently, the follower 128 is engaged with the cam surface 125 within the circular arc region 146 when the at least one output 106 is in the first portion of the effective rotational stroke, is engaged with the cam surface 125 where, or near where, the circular arc region 146 meets the transverse region 148 when the at least one output 106 is in the landing position 110, and is engaged with the cam surface 125 within the transverse region 148 when the at least one output 106 is in the second portion of the effective rotational stroke.

As schematically illustrated in FIGS. 5-7, in some examples of actuation assemblies 102, the follower 128 may be described as comprising a follower bar 158 that extends from the cam 124 to the dual-linkage axle 130. In some examples, the wing support structure 24 defines a first slot 188 that extends perpendicular to the dual-linkage pivot axis 120 and a second slot 190 that extends parallel to the first slot 188, such that the dual-linkage axle 130 is slidingly received within the first slot 188. In such examples, the follower 128 comprises a follower axle 192 that is slidingly received within the second slot 190. Accordingly, the follower 128, and in some examples the follower bar 158, together with the dual-linkage axle 130 are constrained by the first slot 188 and the second slot 190. The first slot 188, in particular, is what facilitates the linear movement of the three-position Krueger flap 26 between the landing configuration 30 and the take-off configuration 32. The second slot 190 in combination with the first slot 188 maintains the follower 128 generally within a single plane.

With continued reference to FIGS. 5-7, in some examples, the drive linkage assembly 114 comprises a first crank arm 160, a second crank arm 162, and a crank coupler 164 coupled between the first crank arm 160 and the second crank arm 162. The first crank arm 160 is coupled to the output 106 of the actuator(s) 104, and the second crank arm 162 is coupled to the primary linkage assembly 116. In particular, the second crank arm 162 is pivotally coupled relative to the wing support structure 24 about a second crank arm pivot axis 170. That is, both the first crank arm 160 and the second crank arm 162 have pivot axes that are fixed relative to the wing support structure 24. Accordingly, when the actuator 104 rotates the first crank arm 160, the second crank arm 162 also rotates.

In some examples, the output 106 to which the first crank arm 160 is coupled has an output axis of rotation 150, and the crank coupler 164 has a longitudinal crank-linkage axis 166 that intersects the output axis of rotation 150 when the three-position Krueger flap 26 is in the landing configuration 30. More specifically, the longitudinal crank-linkage axis 166 is on one side of the output axis of rotation 150 when the three-position Krueger flap 26 is transitioning between the cruise configuration 28 and the landing configuration 30 (FIG. 5), and the longitudinal crank-linkage axis 166 is on an opposite side of the output axis of rotation 150 when the three-position Krueger flap 26 is transitioning between the landing configuration 30 and the take-off configuration 32 (FIG. 7). In other words, the drive linkage assembly 114 has an over-center arrangement, such that during the first portion of the effective rotational stroke of the output 106, the second crank arm 162 pivots in the same direction as the first crank arm 160, but during the second portion of the effective rotational stroke of the output 106, the second crank arm 162 pivots in an opposite direction as the first crank arm 160. This over-center arrangement, together with the secondary linkage assembly 122 facilitates the translational movement of the three-position Krueger flap 26 between the landing configuration 30 and the take-off configuration 32.

With continued reference to FIGS. 5-7, in some examples, the primary linkage assembly 116 further comprises a first primary linkage 168 and a second primary linkage 172. The first primary linkage 168 is coupled to the drive linkage assembly 114 and pivotally coupled relative to the wing support structure 24, and the second primary linkage 172 is pivotally coupled to the first primary linkage 168 and to the dual linkage 118. In some such examples, when the drive linkage assembly 114 comprises the second crank arm 162, the first primary linkage 168 is fixedly coupled to the second crank arm 162 and is pivotally coupled relative to the wing support structure 24 about the second crank arm pivot axis 170. That is, in such examples, the first primary linkage 168 and the second crank arm 162 pivot as a unitary structure about the second crank arm pivot axis 170. In some examples, the three-position Krueger flap 26 is coupled to the second primary linkage 172. That is, the second primary linkage 172 may comprise one or more flap mounts 196 to which the three-position Krueger flap 26 is operatively coupled.

In some examples, the primary linkage assembly 116 also comprises a third primary linkage 174 and a fourth primary linkage 176. The third primary linkage 174 is pivotally coupled to the second primary linkage 172, and the fourth primary linkage 176 is pivotally coupled to the third primary linkage 174 and to the dual linkage 118. For example, the dual linkage 118, the second primary linkage 172, the third primary linkage 174, and the fourth primary linkage 176 may be described as defining a four-bar linkage 178. In some such examples, the three-position Krueger flap 26 is coupled to the third primary linkage 174 and to the fourth primary linkage 176. That is, the third primary linkage 174 and the fourth primary linkage 176 may comprise one or more flap mounts 196 to which the three-position Krueger flap 26 is operatively coupled.

In yet further examples, the primary linkage assembly 116 also comprises a fifth primary linkage 180 that is pivotally coupled to the third primary linkage 174 and coupled to the three-position Krueger flap 26. That is, the fifth primary linkage 180 may comprise one or more flap mounts 196 to which the three-position Krueger flap 26 is operatively coupled.

In yet further examples, the primary linkage assembly 116 also comprises a sixth primary linkage 182 and a seventh primary linkage 184. The sixth primary linkage 182 is pivotally coupled to the third primary linkage 174, and the seventh primary linkage 184 is pivotally coupled to the fourth primary linkage 176 and to the sixth primary linkage 182. In other words, the third primary linkage 174, the fourth primary linkage 176, the sixth primary linkage 182, and the seventh primary linkage 184 may be described as defining a four-bar linkage 186.

Turning now to FIGS. 8-11, an illustrative non-exclusive example of an actuation assembly 102 in the form of example actuation assembly 200 is illustrated. Where appropriate, the reference numerals from the schematic illustrations of FIGS. 5-7 are used to designate corresponding parts of actuation assembly 200; however, the example of FIGS. 8-11 is non-exclusive and does not limit wing assemblies 100 to including the illustrated embodiment of actuation assembly 200. That is, wing assemblies 100 are not limited to including the specific embodiment of the illustrated actuation assembly 200, and wing assemblies 100 may incorporate any number of the various aspects, configurations, characteristics, properties, etc. of wing assemblies 100 that are illustrated in and discussed with reference to the schematic representations of FIGS. 5-7 and/or the embodiment of FIGS. 8-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to actuation assembly 200; however, it is within the scope of the present disclosure that the previously discussed features, variants, etc. may be utilized with actuation assembly 200.

Figure 8:
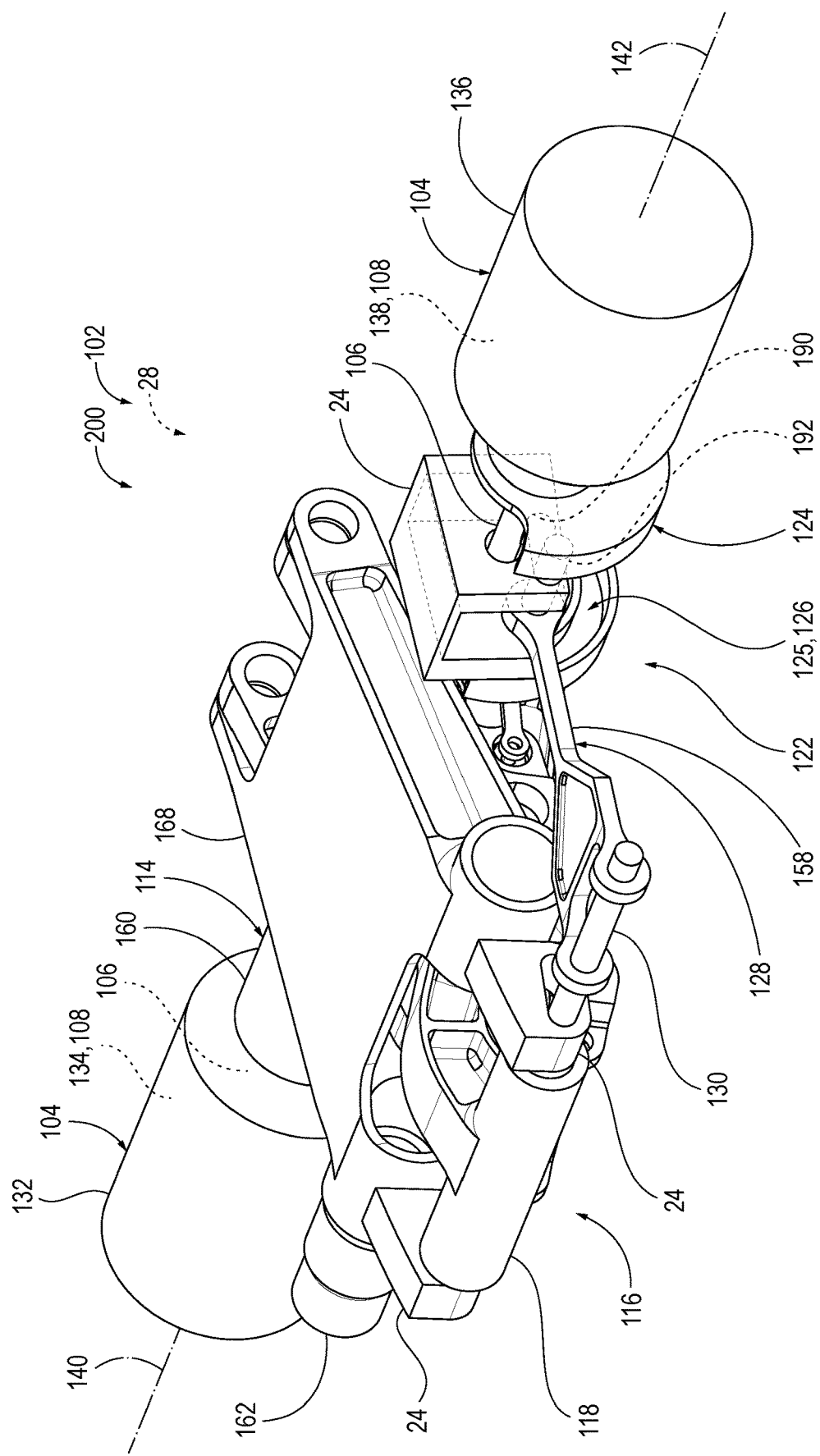
FIG. 8 is an isometric view of an example actuation assembly corresponding to an associated three-position Krueger flap in the cruise configuration.
Figure 9:
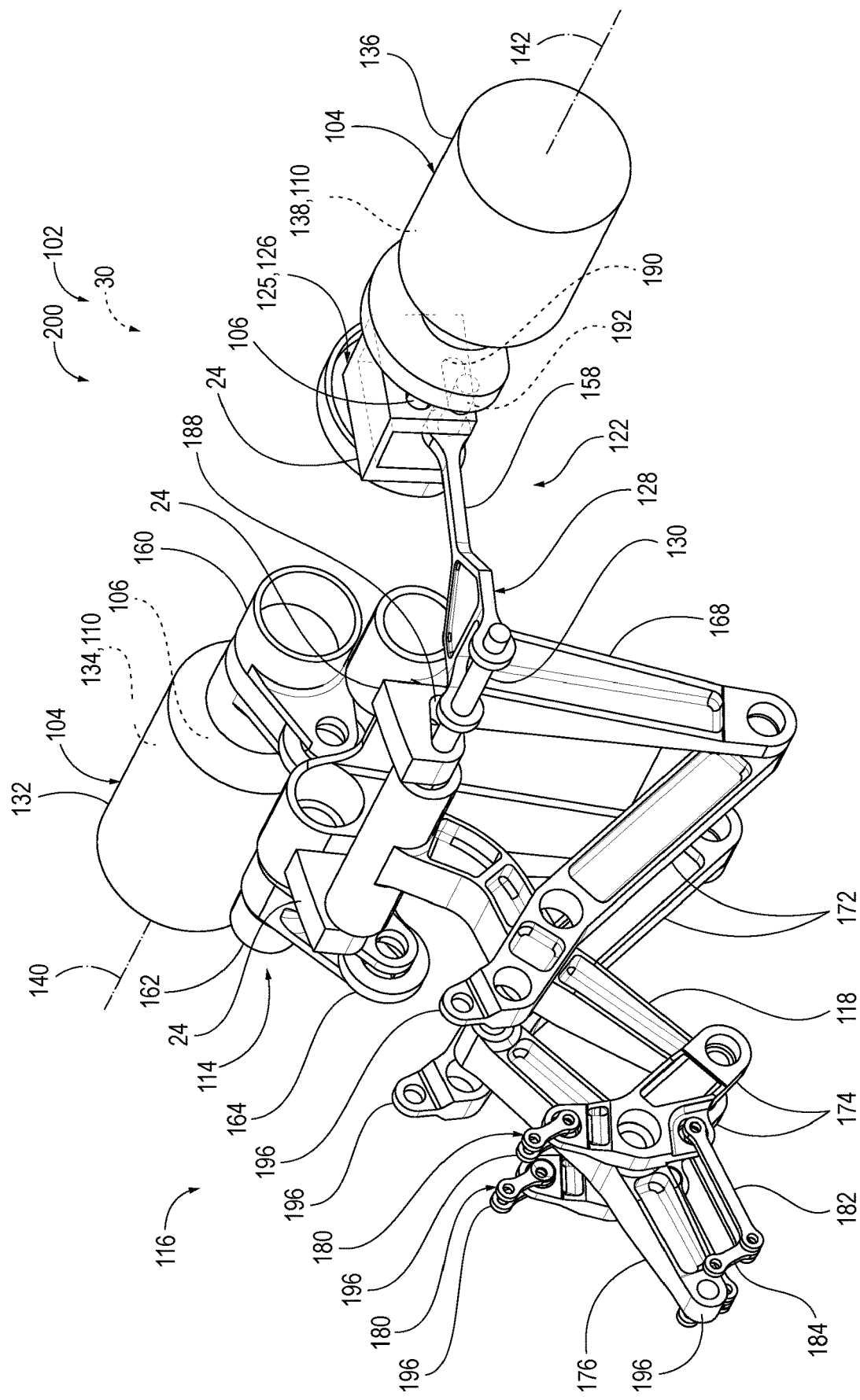
FIG. 9 is an isometric view of the actuation assembly of FIG. 8 corresponding to the associated three-position Krueger flap in the landing configuration.
Figure 10:
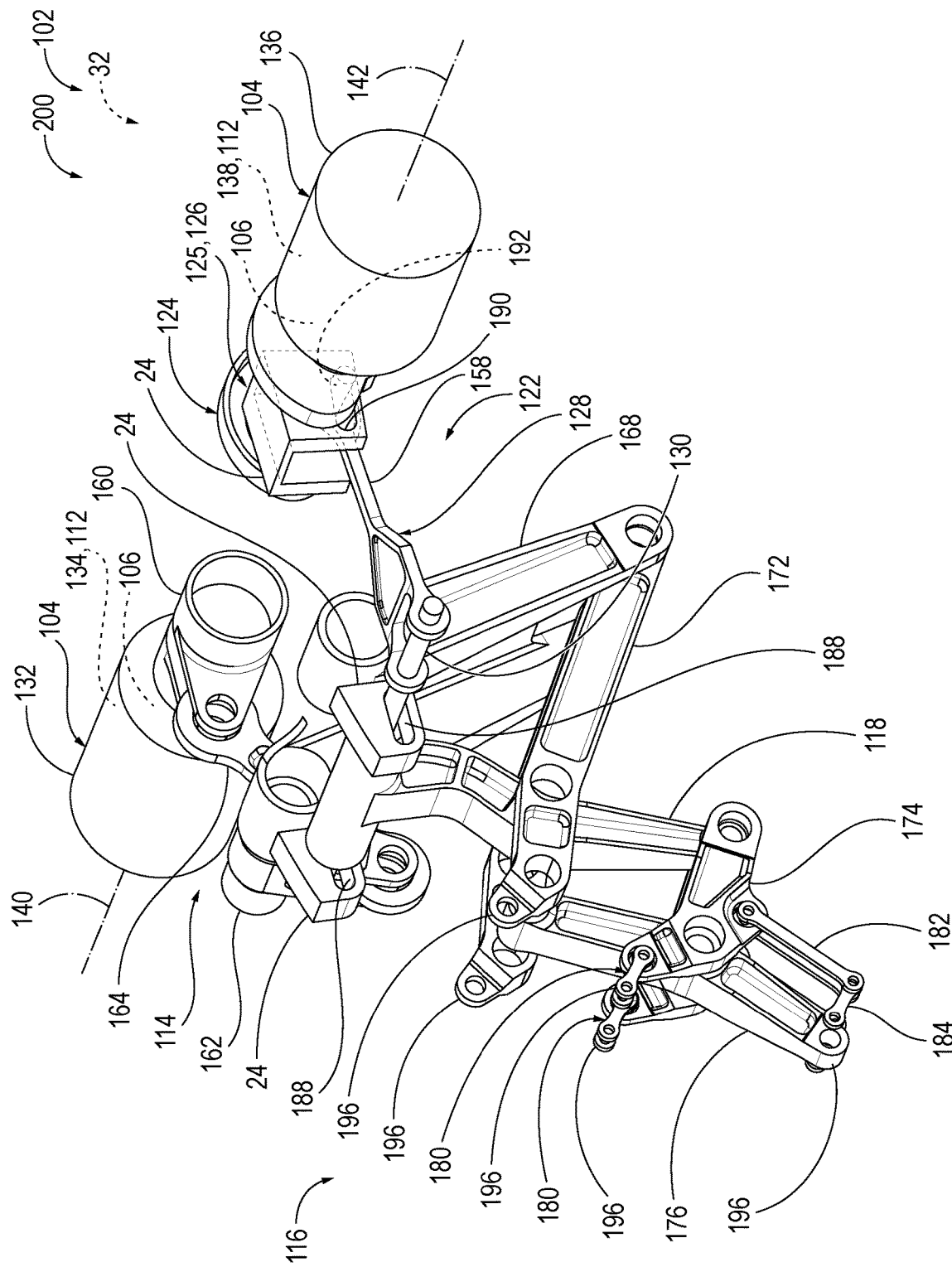
FIG. 10 is an isometric view of the actuation assembly of FIG. 8 corresponding to the associated three-position Krueger flap in the take-off configuration.

FIGS. 8-10 respectively illustrate actuation assembly 200 corresponding to the associated three-position Krueger flap 26 (not illustrated) in the cruise configuration 28, the landing configuration 30, and the take-off configuration 32. For simplicity, in FIGS. 8-10 joint hardware, such as (but not limited to) pins, bushings, washers, bearings, and the like are not shown. Actuation assembly 200 comprises two rotary actuators 104 with rotational outputs 106. More specifically, actuation assembly 200 comprises a primary actuator 132 that comprises a primary output 134 that is coupled to the drive linkage assembly 114, and a secondary actuator 136 that comprises a secondary output 138 that is coupled to a cam 124. The primary actuator 132 and the secondary actuator 136 are operatively coupled together so that the primary output 134 and the secondary output 138 are synchronized. The primary output 134 has a primary axis of rotation 140, and the secondary output 138 has a secondary axis of rotation 142 that is collinear and parallel with the primary axis of rotation 140, although the secondary axis of rotation 142 need not be collinear with the primary axis of rotation 140.

As perhaps best seen in FIGS. 9 and 10, actuation assembly 200 is an example of an actuation assembly 102 whose drive linkage assembly 114 comprises a first crank arm 160, a second crank arm 162, and a crank coupler 164 having an over-center arrangement, as discussed herein. Moreover, the primary linkage assembly 116 of actuation assembly 200 comprises a first primary linkage 168 coupled to the second crank arm 162, a second primary linkage 172, a third primary linkage 174, a fourth primary linkage 176, a fifth primary linkage 180, a sixth primary linkage 182, and a seventh primary linkage 184; with the dual linkage 118, the second primary linkage 172, the third primary linkage 174, and the fourth primary linkage 176 defining a first four-bar linkage 178, and with the third primary linkage 174, the fourth primary linkage 176, the sixth primary linkage 182, and the seventh primary linkage 184 defining a second four-bar linkage 186.

As also perhaps best seen in FIGS. 9 and 10, a follower 128 of the secondary linkage assembly of actuation assembly 200 comprises a follower axle 192 and a follower bar 158 extending from the follower axle 192 to the dual-linkage axle 130. The dual-linkage axle 130 and the follower axle 192 are slidingly received within the first slot 188 and the second slot 190, respectively.

Figure 11:
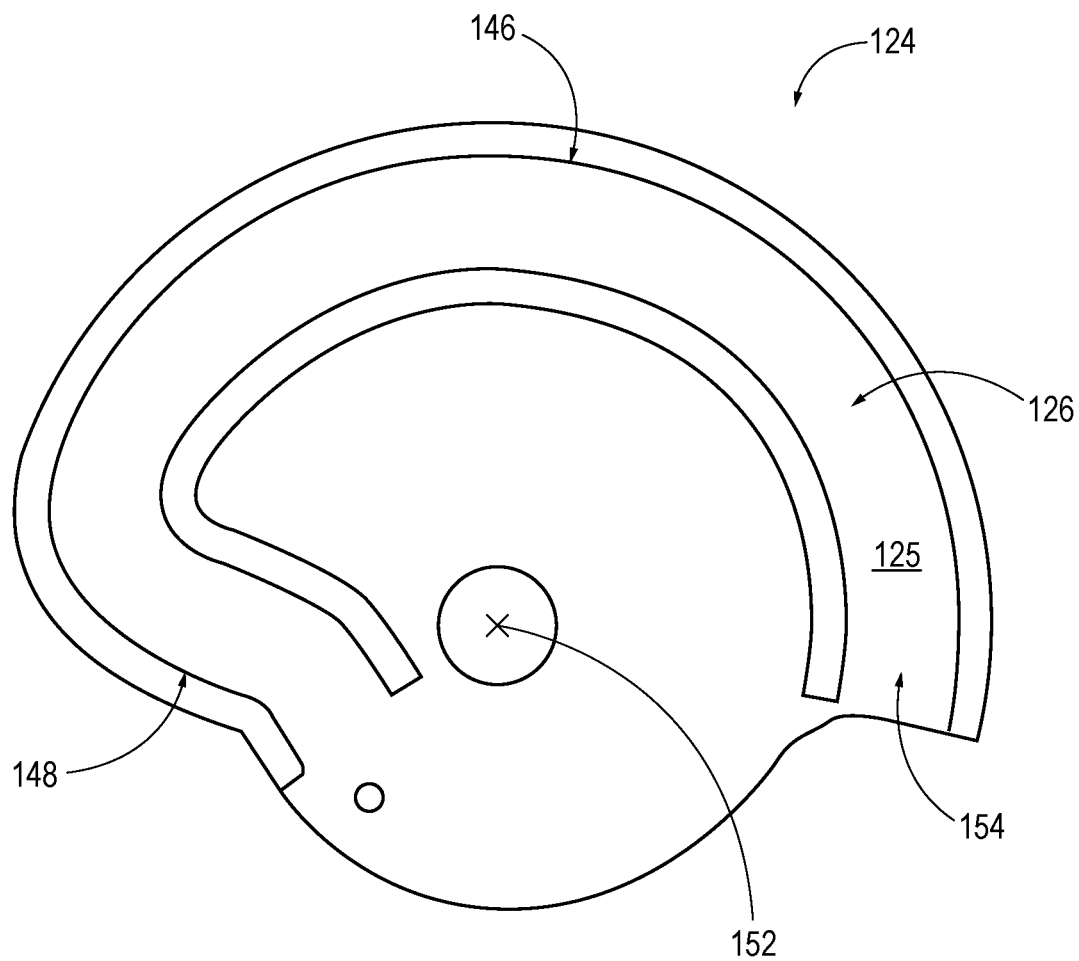
FIG. 11 is a profile view of the cam of the actuation assembly of FIG. 8.

FIG. 11 provides a detailed view of the cam 124 of the secondary linkage assembly 122 of the actuation assembly 102 of actuation assembly 200. As illustrated, the cam 124 defines a channel 154 that defines the cam surface 125, in which the follower axle 192 extends. In addition, the cam profile 126 of the cam 124 is an example of a cam profile 126 that comprises a circular arc region 146 and a transverse region 148 that extends radially inward from the circular arc region 146.

Also within the scope of the present disclosure are methods of operating a three-position Krueger flap of a wing assembly of an aircraft. Such methods comprise transitioning the three-position Krueger flap between a take-off configuration to a landing configuration by translating, relative to a wing support structure, a dual-linkage pivot axis of a dual linkage of a primary linkage assembly that is coupled between a drive linkage assembly and the three-position Krueger flap. The drive linkage assembly is coupled to at least one output of at least one actuator that is mounted to the wing support structure. Although not required in all such methods, the wing assembly may be a wing assembly 100 according to the present disclosure.

Illustrative, non-exclusive examples of inventive subject matter according to the present disclosure are described in the following enumerated paragraphs:

A. A wing assembly (100), comprising:
  a primary airfoil (22);
  a three-position Krueger flap (26) operatively coupled relative to the primary airfoil (22);
  a wing support structure (24); and
  an actuation assembly (102), comprising:
    at least one actuator (104) mounted to the wing support structure (24) and comprising at least one output (106);
    a drive linkage assembly (114) coupled to the at least one output (106) of the at least one actuator (104);
    a primary linkage assembly (116) coupled between the drive linkage assembly (114) and the three-position Krueger flap (26), wherein the primary linkage assembly (116) comprises a dual linkage (118) that is pivotally and translationally coupled relative to the wing support structure (24) about a dual-linkage pivot axis (120); and
    a secondary linkage assembly (122) comprising:
      a cam (124) coupled to the at least one output (106) of the at least one actuator (104) and comprising a cam surface (125) that defines a cam profile (126);
      a follower (128) engaged with the cam surface (125); and
      a dual-linkage axle (130) operatively coupled to the follower (128) and to the dual linkage (118), wherein the dual-linkage axle (130) defines the dual-linkage pivot axis (120).

A1. The wing assembly (100) of paragraph A, wherein the at least one output (106) has an effective rotational stroke comprising a first portion ranging from a cruise position (108) at one terminus of the effective rotational stroke to a landing position (110), and a second portion ranging from the landing position (110) to a take-off position (112) at an opposite terminus of the effective rotational stroke; wherein the three-position Krueger flap (26) is in a cruise configuration (28) when the at least one output (106) is in the cruise position (108), the three-position Krueger flap (26) is in a landing configuration (30) when the at least one output (106) is in the landing position (110), and the three-position Krueger flap (26) is in a take-off configuration (32) when the at least one output (106) is in the take-off position (112).

A2. The wing assembly (100) of any of paragraphs A-A1, wherein the at least one actuator (104) comprises:
  a primary actuator (132) comprising a primary output (134) coupled to the drive linkage assembly (114); and
  a secondary actuator (136) comprising a secondary output (138) coupled to the cam (124).

A2.1. The wing assembly (100) of paragraph A2, wherein the primary actuator (132) and the secondary actuator (136) are operatively coupled together so that the primary output (134) and the secondary output (138) are synchronized.

A2.2. The wing assembly (100) of any of paragraphs A2-A2.1, wherein the primary output (134) has a primary axis of rotation (140), and wherein the secondary output (138) has a secondary axis of rotation (142).

A2.2.1. The wing assembly (100) of paragraph A2.2, wherein the primary axis of rotation (140) and the secondary axis of rotation (142) are collinear.

A2.2.2. The wing assembly (100) of paragraph A2.2, wherein the primary axis of rotation (140) and the secondary axis of rotation (142) are parallel and non-collinear.

A3. The wing assembly (100) of any of paragraphs A-A1, wherein the at least one actuator (104) comprises a single actuator.

A4. The wing assembly (100) of any of paragraphs A-A3, wherein the at least one actuator (104) comprises a rotary actuator (144).

A5. The wing assembly (100) of any of paragraphs A-A4, wherein the cam profile (126) comprises a circular arc region (146) and a transverse region (148) extending radially inward from the circular arc region (146).

A5.1. The wing assembly (100) of paragraph A5, wherein the at least one output (106) has an output axis of rotation (150), wherein the circular arc region (146) has a center (152) that coincides with the output axis of rotation (150).

A5.2. The wing assembly (100) of any of paragraphs A5-A5.1, wherein the follower (128) is engaged with the cam surface (125) within the circular arc region (146) of the cam profile (126) when the three-position Krueger flap (26) is transitioning between a/the cruise configuration (28) and a/the landing configuration (30), and wherein the follower (128) is engaged with the cam surface (125) within the transverse region (148) of the cam profile (126) when the three-position Krueger flap (26) is transitioning between the landing configuration (30) and a/the take-off configuration (32).

A5.3. The wing assembly (100) of any of paragraphs A5-A5.2, wherein the three-position Krueger flap (26) is in a/the landing configuration (30) when the follower (128) is engaged with the cam surface (125) where, or near where, the circular arc region (146) meets the transverse region (148).

A5.4. The wing assembly (100) of any of paragraphs A5-A5.3 when depending from paragraph A1,
  wherein the follower (128) is engaged with the cam surface (125) within the circular arc region (146) when the at least one output (106) is in the first portion of the effective rotational stroke;
  wherein the follower (128) is engaged with the cam surface (125) where, or near where, the circular arc region (146) meets the transverse region (148) when the at least one output (106) is in the landing position (110); and
  wherein the follower (128) is engaged with the cam surface (125) within the transverse region (148) when the at least one output (106) is in the second portion of the effective rotational stroke.

A6. The wing assembly (100) of any of paragraphs A-A5.4, wherein the cam (124) defines a channel (154) that defines the cam surface (125), and wherein the follower (128) extends into the channel (154).

A7. The wing assembly (100) of any of paragraphs A-A6, wherein the follower (128) comprises a roller engaged with the cam surface (125).

A8. The wing assembly (100) of any of paragraphs A-A7, wherein the follower (128) comprises a follower bar (158) extending from the cam (124) to the dual-linkage axle (130).

A9. The wing assembly (100) of any of paragraphs A-A8, wherein the wing support structure (24) defines a first slot (188) extending perpendicular to the dual-linkage pivot axis (120) and a second slot (190) extending parallel to the first slot (188), wherein the dual-linkage axle (130) is slidingly received within the first slot (188), and wherein the follower (128) comprises a follower axle (192) that is slidingly received within the second slot (190).

A9.1. The wing assembly (100) of paragraph A9 when depending from paragraph A7, wherein the follower axle (192) defines a roller axis of the roller.

A10. The wing assembly (100) of any of paragraphs A-A9.1, wherein the drive linkage assembly (114) comprises:
  a first crank arm (160) coupled to the at least one output (106);
  a second crank arm (162) pivotally coupled relative to the wing support structure (24) about a second crank arm pivot axis (170), wherein the second crank arm (162) is coupled to the primary linkage assembly (116); and
  a crank coupler (164) coupled between the first crank arm (160) and the second crank arm (162).

A10.1. The wing assembly (100) of paragraph A10, wherein the at least one output (106) has an/the output axis of rotation (150), wherein the crank coupler (164) has a longitudinal crank-linkage axis (166), and wherein the longitudinal crank-linkage axis (166) intersects the output axis of rotation (150) when the three-position Krueger flap (26) is in a/the landing configuration (30).

A10.1.1. The wing assembly (100) of paragraph A10.1, wherein the longitudinal crank-linkage axis (166) is on one side of the output axis of rotation (150) when the three-position Krueger flap (26) is transitioning between a/the cruise configuration (28) and the landing configuration (30), and wherein the longitudinal crank-linkage axis (166) is on an opposite side of the output axis of rotation (150) when the three-position Krueger flap (26) is transitioning between the landing configuration (30) and a/the take-off configuration (32).

A11. The wing assembly (100) of any of paragraphs A-A10.1.1, wherein the primary linkage assembly (116) further comprises:
  a first primary linkage (168) coupled to the drive linkage assembly (114) and pivotally coupled relative to the wing support structure (24); and
  a second primary linkage (172) pivotally coupled to the first primary linkage (168) and to the dual linkage (118).

A11.1 The wing assembly (100) of paragraph A11 when depending from paragraph A10, wherein the first primary linkage (168) is fixedly coupled to the second crank arm (162) and is pivotally coupled relative to the wing support structure (24) about the second crank arm pivot axis (170).

A11.2. The wing assembly (100) of any of paragraphs A11-A11.1, wherein the three-position Krueger flap (26) is coupled to the second primary linkage (172).

A11.3. The wing assembly (100) of any of paragraphs A11-A11.2, wherein the primary linkage assembly (116) further comprises:
  a third primary linkage (174) pivotally coupled to the second primary linkage (172); and
  a fourth primary linkage (176) pivotally coupled to the third primary linkage (174) and to the dual linkage (118).

A11.3.1. The wing assembly (100) of paragraph A11.3, wherein the dual linkage (118), the second primary linkage (172), the third primary linkage (174), and the fourth primary linkage (176) define a first four-bar linkage (178).

A11.3.2. The wing assembly (100) of any of paragraphs A11.3-A11.3.1, wherein the three-position Krueger flap (26) is coupled to the third primary linkage (174) and to the fourth primary linkage (176).

A11.3.3. The wing assembly (100) of any of paragraphs A11.3-A11.3.2, wherein the primary linkage assembly (116) further comprises a fifth primary linkage (180) pivotally coupled to the third primary linkage (174) and is coupled to the three-position Krueger flap (26).

A11.3.4. The wing assembly (100) of any of paragraphs A11.3-A11.3.3,
  wherein the primary linkage assembly (116) further comprises:
    a sixth primary linkage (182) pivotally coupled to the third primary linkage (174);

a seventh primary linkage (184) pivotally coupled to the fourth primary linkage (176) and to the sixth primary linkage (182); and wherein the third primary linkage (174), the fourth primary linkage (176), the sixth primary linkage (182), and the seventh primary linkage (184) define a second four-bar linkage (186).

B. A method of operating a three-position Krueger flap (26) of a wing assembly (100) of an aircraft (10), the method comprising:

transitioning the three-position Krueger flap (26) between a take-off configuration (32) and a landing configuration (30) by translating, relative to a wing support structure (24), a dual-linkage pivot axis (120) of a dual linkage (118) of a primary linkage assembly (116) that is coupled between a drive linkage assembly (114) and the three-position Krueger flap (26), wherein the drive linkage assembly (114) is coupled to at least one output (106) of at least one actuator (104) that is mounted to the wing support structure (24).

B1. The method of paragraph B, wherein the wing assembly (100) is the wing assembly (100) of any of paragraphs A-A11.3.4.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A wing assembly, comprising:
    a primary airfoil;
    a three-position Krueger flap operatively coupled relative to the primary airfoil;
    a wing support structure; and
    an actuation assembly, comprising:
        at least one actuator mounted to the wing support structure and comprising at least one output;
        a drive linkage assembly coupled to the at least one output of the at least one actuator;
        a primary linkage assembly coupled between the drive linkage assembly and the three-position Krueger flap, wherein the primary linkage assembly comprises a dual linkage that is pivotally and translationally coupled relative to the wing support structure about a dual-linkage pivot axis; and
        a secondary linkage assembly comprising:
            a cam coupled to the at least one output of the at least one actuator and comprising a cam surface that defines a cam profile;
            a follower engaged with the cam surface; and
            a dual-linkage axle operatively coupled to the follower and to the dual linkage, wherein the dual-linkage axle defines the dual-linkage pivot axis.

2. The wing assembly of claim 1, wherein the at least one output has an effective rotational stroke comprising a first portion ranging from a cruise position at one terminus of the effective rotational stroke to a landing position, and a second portion ranging from the landing position to a take-off position at an opposite terminus of the effective rotational stroke, wherein the three-position Krueger flap is in a cruise configuration when the at least one output is in the cruise position, the three-position Krueger flap is in a landing configuration when the at least one output is in the landing position, and the three-position Krueger flap is in a take-off configuration when the at least one output is in the take-off position.

3. The wing assembly of claim 1, wherein the at least one actuator comprises:
    a primary actuator comprising a primary output coupled to the drive linkage assembly; and
    a secondary actuator comprising a secondary output coupled to the cam.

4. The wing assembly of claim 3, wherein the primary actuator and the secondary actuator are operatively coupled together so that the primary output and the secondary output are synchronized.

5. The wing assembly of claim 3, wherein the primary output has a primary axis of rotation, and wherein the secondary output has a secondary axis of rotation.

6. The wing assembly of claim 5, wherein the primary axis of rotation and the secondary axis of rotation are collinear.

7. The wing assembly of claim 1, wherein the at least one actuator comprises a single actuator.

8. The wing assembly of claim 1, wherein the at least one actuator comprises a rotary actuator.

9. The wing assembly of claim 1, wherein the cam profile comprises a circular arc region and a transverse region extending radially inward from the circular arc region.

10. The wing assembly of claim 9, wherein the at least one output has an output axis of rotation, wherein the circular arc region has a center that coincides with the output axis of rotation.

11. The wing assembly of claim 9, wherein the follower is engaged with the cam surface within the circular arc region of the cam profile when the three-position Krueger flap is transitioning between a cruise configuration and a landing configuration, and wherein the follower is engaged with the cam surface within the transverse region of the cam profile when the three-position Krueger flap is transitioning between the landing configuration and a take-off configuration.

12. The wing assembly of claim 9, wherein the three-position Krueger flap is in a landing configuration when the follower is engaged with the cam surface where the circular arc region meets the transverse region.

13. The wing assembly of claim 9,
wherein the at least one output has an effective rotational stroke comprising a first portion ranging from a cruise position at one terminus of the effective rotational stroke to a landing position, and a second portion ranging from the landing position to a take-off position at an opposite terminus of the effective rotational stroke, wherein the three-position Krueger flap is in a cruise configuration when the at least one output is in the cruise position, the three-position Krueger flap is in a landing configuration when the at least one output is in the landing position, and the three-position Krueger flap is in a take-off configuration when the at least one output is in the take-off position;
wherein the follower is engaged with the cam surface within the circular arc region when the at least one output is in the first portion of the effective rotational stroke;
wherein the follower is engaged with the cam surface where the circular arc region meets the transverse region when the at least one output is in the landing position; and
wherein the follower is engaged with the cam surface within the transverse region when the at least one output is in the second portion of the effective rotational stroke.

14. The wing assembly of claim 1, wherein the cam defines a channel that defines the cam surface, and wherein the follower extends into the channel.

15. The wing assembly of claim 1, wherein the follower comprises a follower bar extending from the cam to the dual-linkage axle.

16. The wing assembly of claim 1, wherein the wing support structure defines a first slot extending perpendicular to the dual-linkage pivot axis and a second slot extending parallel to the first slot, wherein the dual-linkage axle is slidingly received within the first slot, and wherein the follower comprises a follower axle that is slidingly received within the second slot.

17. The wing assembly of claim 1, wherein the drive linkage assembly comprises:
a first crank arm coupled to the at least one output;
a second crank arm pivotally coupled relative to the wing support structure about a second crank arm pivot axis, wherein the second crank arm is coupled to the primary linkage assembly; and
a crank coupler coupled between the first crank arm and the second crank arm.

18. The wing assembly of claim 17,
wherein the at least one output has an output axis of rotation, wherein the crank coupler has a longitudinal crank-linkage axis, and wherein the longitudinal crank-linkage axis intersects the output axis of rotation when the three-position Krueger flap is in a landing configuration; and
wherein the longitudinal crank-linkage axis is on one side of the output axis of rotation when the three-position Krueger flap is transitioning between a cruise configuration and the landing configuration, and wherein the longitudinal crank-linkage axis is on an opposite side of the output axis of rotation when the three-position Krueger flap is transitioning between the landing configuration and a take-off configuration.

19. The wing assembly of claim 17, wherein the primary linkage assembly further comprises:
a first primary linkage coupled to the drive linkage assembly and pivotally coupled relative to the wing support structure, wherein the first primary linkage is fixedly coupled to the second crank arm and is pivotally coupled relative to the wing support structure about the second crank arm pivot axis;
a second primary linkage pivotally coupled to the first primary linkage and to the dual linkage and coupled to the three-position Krueger flap;
a third primary linkage pivotally coupled to the second primary linkage and coupled to the three-position Krueger flap); and
a fourth primary linkage pivotally coupled to the third primary linkage and to the dual linkage and coupled to the three-position Krueger flap, wherein the dual linkage, the second primary linkage, the third primary linkage, and the fourth primary linkage define a first four-bar linkage;
a fifth primary linkage pivotally coupled to the third primary linkage and coupled to the three-position Krueger flap;
a sixth primary linkage pivotally coupled to the third primary linkage; and
a seventh primary linkage pivotally coupled to the fourth primary linkage and to the sixth primary linkage, wherein the third primary linkage, the fourth primary linkage, the sixth primary linkage, and the seventh primary linkage define a second four-bar linkage.

20. A method of operating a three-position Krueger flap of a wing assembly of an aircraft, the method comprising:
transitioning the three-position Krueger flap between a take-off configuration and a landing configuration by linearly translating, relative to a wing support structure, a dual-linkage pivot axis of a dual linkage of a primary linkage assembly that is coupled between a drive linkage assembly and the three-position Krueger flap, wherein the drive linkage assembly is coupled to at least one output of at least one actuator that is mounted to the wing support structure.

* * * * *